(12) United States Patent
Cheng et al.

(10) Patent No.: US 7,497,301 B2
(45) Date of Patent: Mar. 3, 2009

(54) TUBULAR ACOUSTIC SILENCER

(75) Inventors: C. Raymond Cheng, Madison, WI (US);
Zakir Ahmad Quabili, Livonia, MI
(US); Larry T. Gunderson, Sun Prairie,
WI (US); Mark V. Holzmann,
Stoughton, WI (US)

(73) Assignee: Fleetguard, Inc., Nashville, TN (US)

( * ) Notice: Subject to any disclaimer, the term of this
patent is extended or adjusted under 35
U.S.C. 154(b) by 450 days.

(21) Appl. No.: 11/201,390

(22) Filed: Aug. 10, 2005

(65) Prior Publication Data
US 2006/0180389 A1    Aug. 17, 2006

Related U.S. Application Data

(63) Continuation-in-part of application No. 11/044,775, filed on Jan. 27, 2005.

(51) Int. Cl.
*F01N 1/02* (2006.01)
*E04B 1/84* (2006.01)
*F01N 7/08* (2006.01)

(52) U.S. Cl. .................. 181/248; 181/250; 181/293

(58) Field of Classification Search .............. 181/248, 181/250, 266, 270, 273, 276, 293
See application file for complete search history.

(56) References Cited

U.S. PATENT DOCUMENTS

| 1,554,180 | A | * | 9/1925 | Trader | 52/144 |
|---|---|---|---|---|---|
| 2,297,046 | A | * | 9/1942 | Bourne | 181/250 |
| 3,913,702 | A | * | 10/1975 | Wirt et al. | 181/286 |
| 3,955,643 | A | * | 5/1976 | Clark | 181/248 |
| 4,065,276 | A | | 12/1977 | Nakaya et al. | |
| 4,091,892 | A | * | 5/1978 | Hehmann et al. | 181/286 |
| 4,106,587 | A | * | 8/1978 | Nash et al. | 181/213 |
| 4,113,053 | A | * | 9/1978 | Matsumoto et al. | 181/284 |
| 4,160,491 | A | * | 7/1979 | Matsumoto et al. | 181/284 |
| 4,252,212 | A | * | 2/1981 | Meier | 181/248 |
| 4,263,982 | A | * | 4/1981 | Feuling | 181/256 |
| 4,296,831 | A | * | 10/1981 | Bennett | 181/224 |
| 4,314,621 | A | * | 2/1982 | Hansen | 181/233 |
| 4,371,054 | A | * | 2/1983 | Wirt | 181/252 |
| 4,607,466 | A | * | 8/1986 | Allred | 52/144 |
| 4,645,032 | A | * | 2/1987 | Ross et al. | 181/250 |
| 4,971,612 | A | | 11/1990 | Loughran | |
| 5,125,475 | A | * | 6/1992 | Ducharme et al. | 181/284 |
| 5,140,957 | A | | 8/1992 | Walker | |
| 5,362,931 | A | * | 11/1994 | Fries | 181/284 |
| 5,417,727 | A | | 5/1995 | Bowen et al. | |
| 5,792,247 | A | | 8/1998 | Gillingham et al. | |
| 5,936,210 | A | * | 8/1999 | Borneby et al. | 181/264 |
| 5,947,081 | A | | 9/1999 | Kim | |

(Continued)

OTHER PUBLICATIONS

Delphi Device, admitted prior art.

(Continued)

*Primary Examiner*—Edgardo San Martin
(74) *Attorney, Agent, or Firm*—Andrus, Sceales, Starke & Sawall, LLP; J. Bruce Schelkope

(57) ABSTRACT

An acoustic silencer is provided by a tubular member extending along an axis and having a hollow interior defining an axial flow path therethrough. The tubular member has a sidewall with an interior face facing the hollow interior and having quarter wave resonators formed by blind holes therein.

7 Claims, 12 Drawing Sheets

U.S. PATENT DOCUMENTS

| | | | |
|---|---|---|---|
| 5,959,265 A * | 9/1999 | Van Ligten | 181/286 |
| 6,009,846 A | 1/2000 | Walker, Jr. | |
| 6,167,985 B1 * | 1/2001 | Van Ligten | 181/286 |
| 6,290,022 B1 * | 9/2001 | Wolf et al. | 181/292 |
| 6,550,446 B1 | 4/2003 | Robley, Jr. | |
| 6,688,425 B2 * | 2/2004 | Cole et al. | 181/264 |
| 6,752,240 B1 * | 6/2004 | Schlagenhaft | 181/249 |
| 6,789,646 B2 * | 9/2004 | Wang et al. | 181/293 |
| 6,802,388 B2 | 10/2004 | Wolf et al. | |
| 6,802,880 B1 | 10/2004 | Wijaya | |
| 7,086,497 B2 * | 8/2006 | Cole et al. | 181/248 |
| 7,267,297 B2 * | 9/2007 | Campbell et al. | 244/1 N |
| 2004/0255660 A1 | 12/2004 | Abdolhosseini et al. | |
| 2006/0180388 A1 * | 8/2006 | Brown et al. | 181/250 |

OTHER PUBLICATIONS

WOCO Device, admitted prior art.
Siemens Device, admitted prior art.

* cited by examiner

TUBULAR ACOUSTIC SILENCER

CROSS-REFERENCE TO RELATED APPLICATIONS

The present application is a continuation-in-part of U.S. patent application Ser. No. 11/044,775, filed Jan. 27, 2005.

BACKGROUND AND SUMMARY

The present invention relates to tubular acoustic silencers.

Parent Application

The above noted parent '775 application relates to air filtration cartridges. Air filtration cartridges are known in the prior art and are typically provided by annular filter media having a hollow interior and extending axially between first and second distally opposite end caps, one of which is an outlet end cap, and the other of which may be closed. In internal combustion engine applications, engine manufacturers are increasingly demanding filters which do not interfere with mass air flow sensors (MAFS) that are typically placed directly downstream from the filter cartridge and are sensitive to filter cartridge geometry/imperfections causing variable and inconsistent air flow velocity profiles. In the case of turbo/supercharged engines, there is an increasing demand for sound attenuation. The latter requirement is typically satisfied by incorporating a separate device in the system, though a more cost effective solution would be desirable.

Present Application

The present invention arose during continuing development efforts relating to the above noted parent application, though the present invention is not limited thereto.

The present invention also arose during continuing development efforts directed toward frequency attenuation in an air induction system for a motor vehicle, though the invention is not limited thereto.

The invention provides various improvements in tubular acoustic silencers.

BRIEF DESCRIPTION OF THE DRAWING

Parent Application

FIG. 1 is a perspective view partially cut-away of an air filtration cartridge in accordance with the parent application.

FIG. 2 is a sectional view of the structure of FIG. 1.

FIG. 3 is a perspective view of another angle of an air filtration cartridge in accordance with the parent application.

FIG. 4 is an end elevation view of the construction of FIG. 3.

FIG. 5 is a sectional view taken along line 5-5 of FIG. 4.

FIG. 6 is a perspective view of an alternate embodiment of a portion of the structure of FIG. 1.

FIG. 7 is an end elevation view of the structure of FIG. 6.

FIG. 8 is a side elevation view of the structure of FIG. 6.

FIG. 9 is a perspective view of another alternate embodiment of a portion of the structure of FIG. 1.

FIG. 10 is an end elevation view of the structure of FIG. 9.

FIG. 11 is a side elevation view of the structure of FIG. 9.

FIG. 12 is a side elevation view of the structure of FIG. 9, turned 90° relative to FIG. 11.

Present Application

Figure 13:
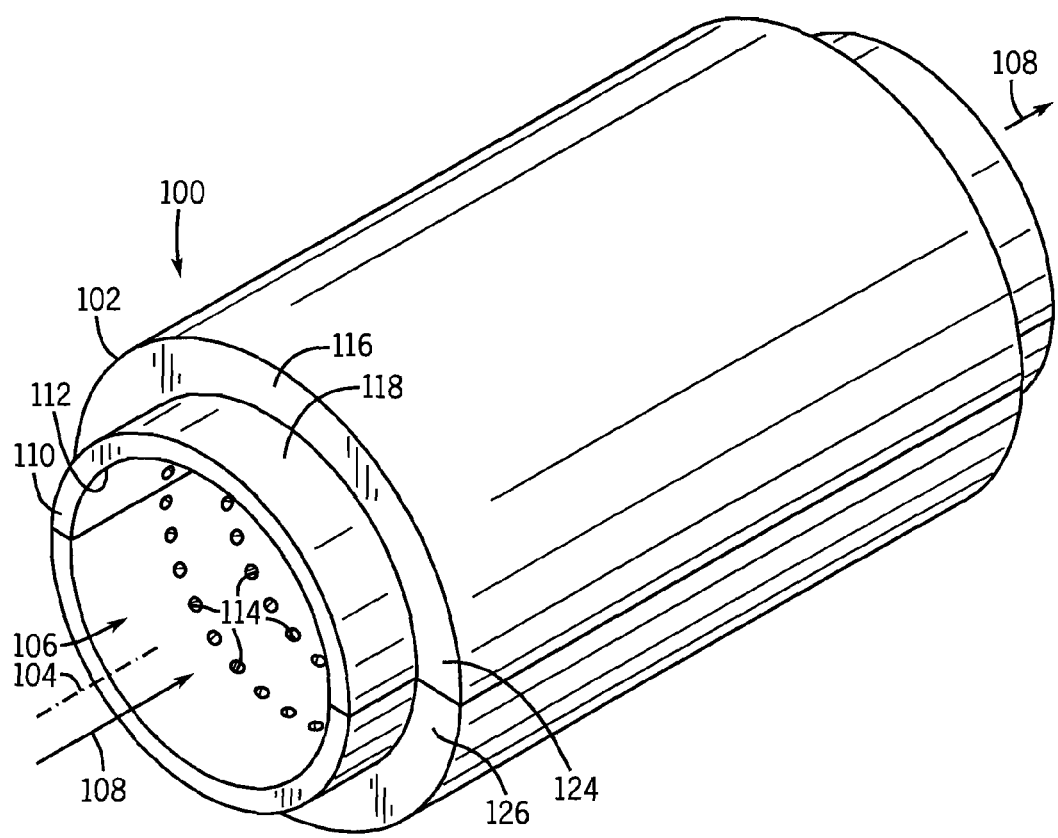

FIG. 13 is a perspective view of an acoustic silencer in accordance with the invention.

Figure 14:
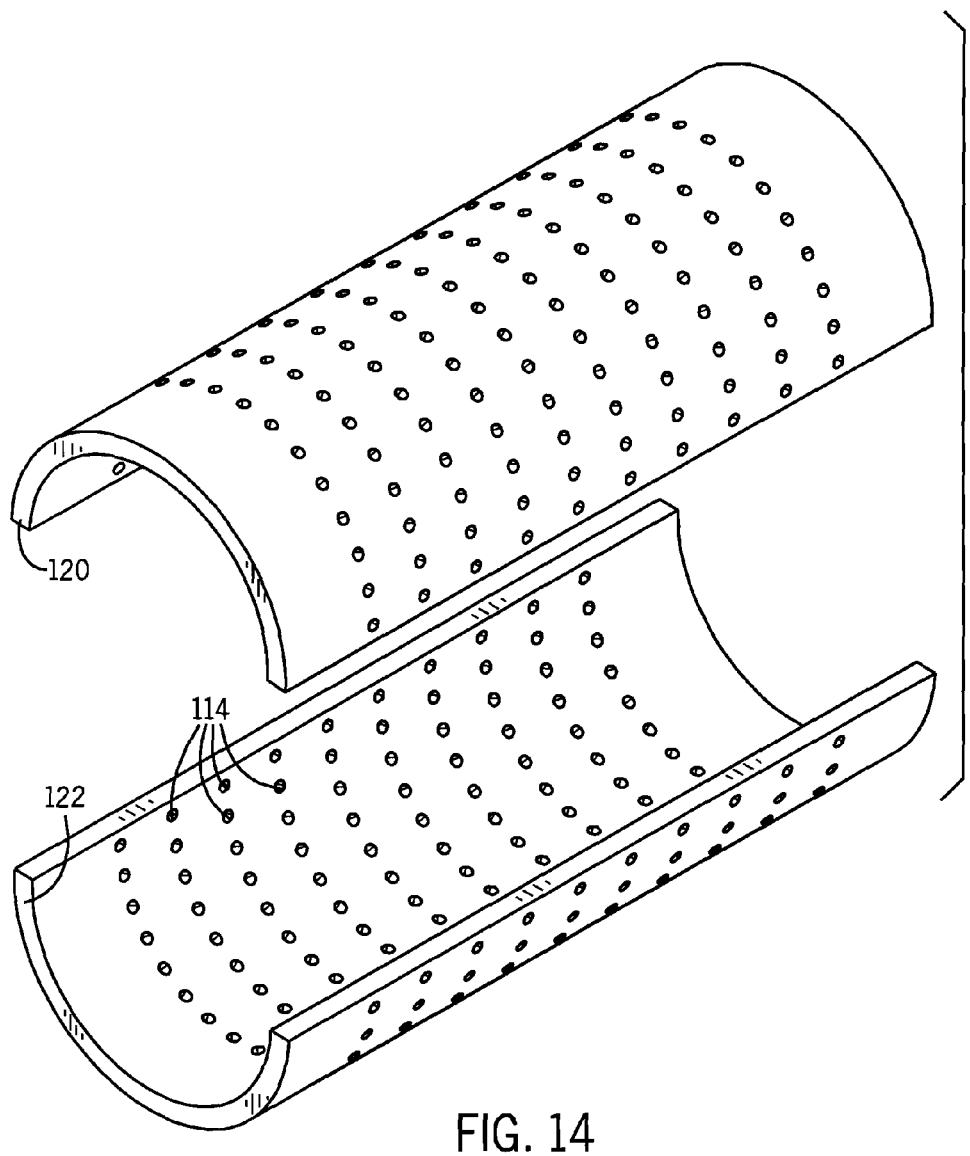

FIG. 14 is an exploded perspective view of a portion of FIG. 13.

Figure 15:
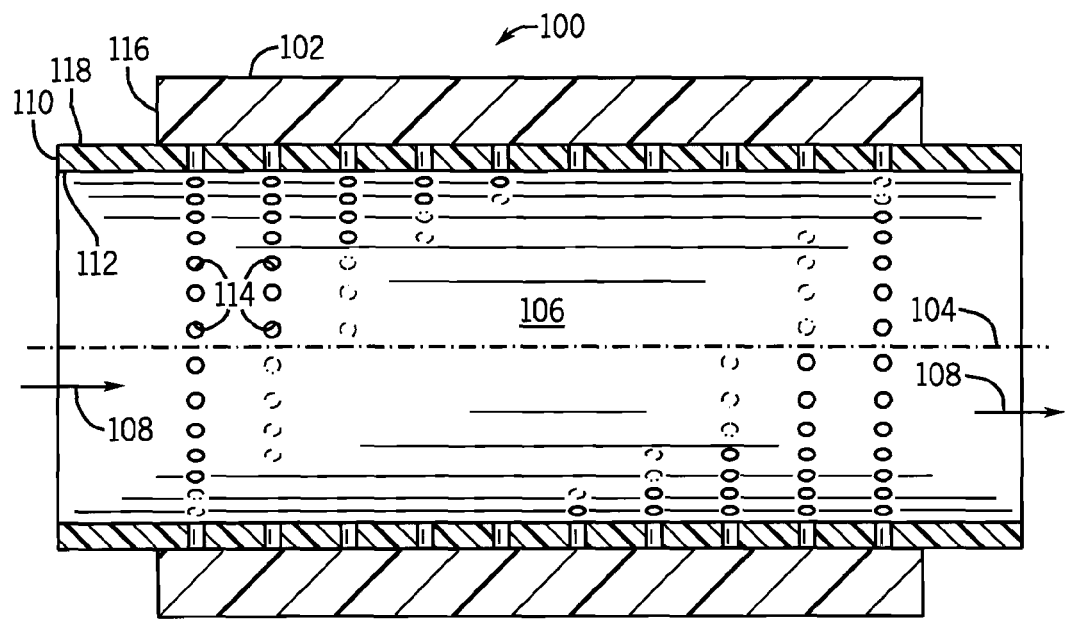

FIG. 15 is a side sectional view of the construction of FIG. 13.

Figure 16:
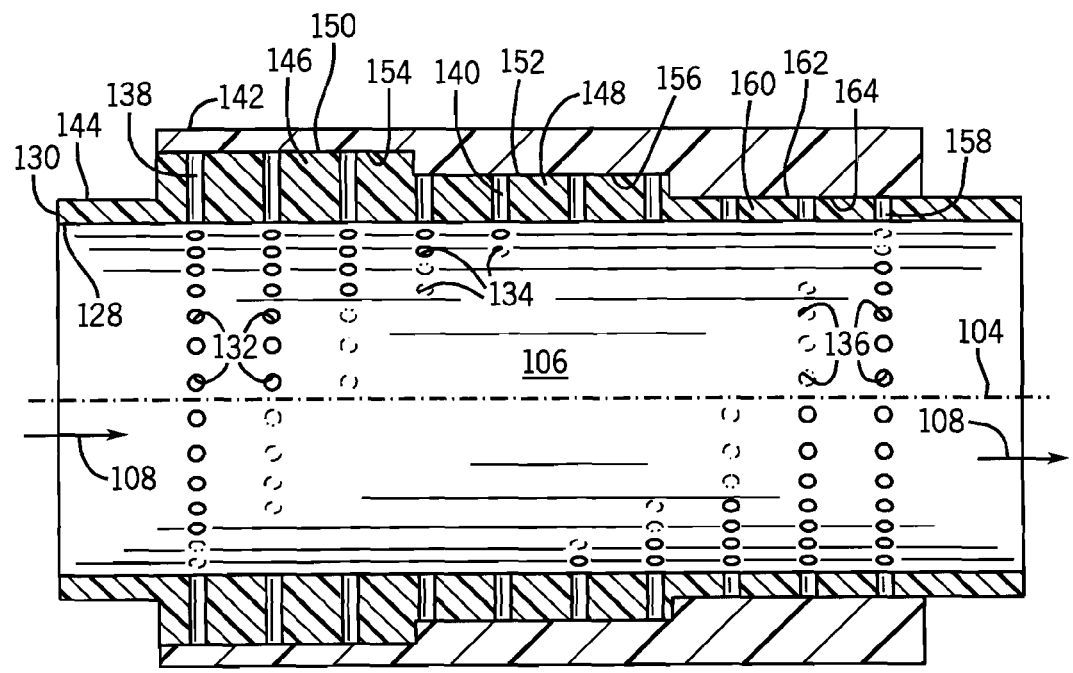

FIG. 16 is like FIG. 15 and shows another embodiment.

Figure 17:
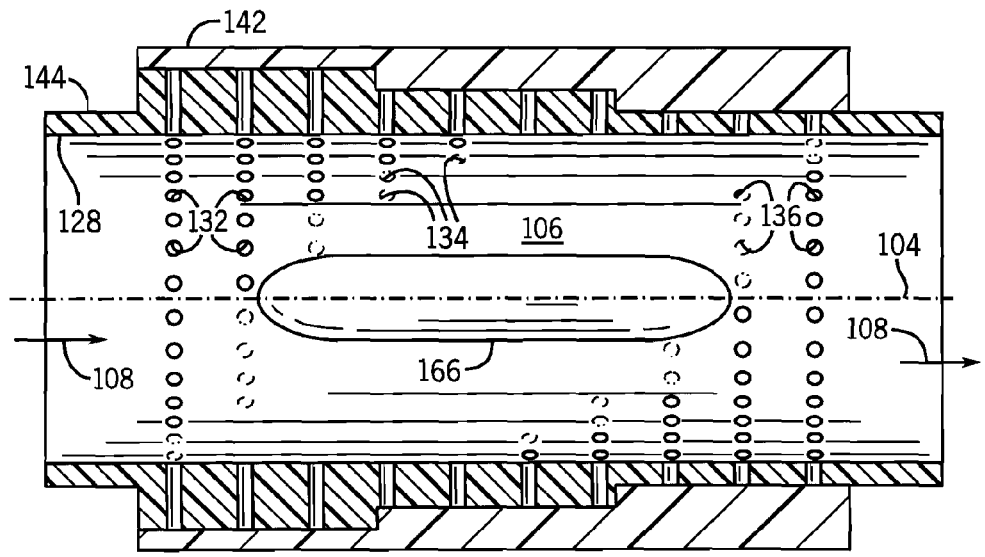

FIG. 17 is like FIG. 16 and shows another embodiment.

Figure 18:
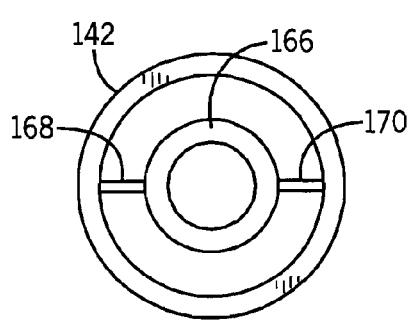

FIG. 18 is an end elevation view of the construction of FIG. 17.

Figure 19:
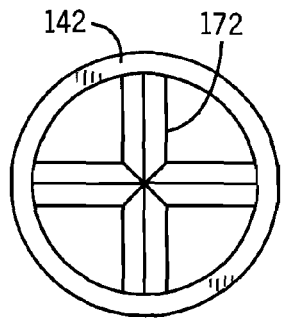

FIG. 19 is like FIG. 18 and shows another embodiment.

Figure 20:
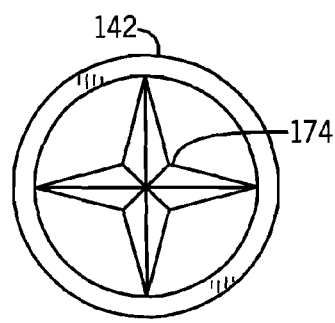

FIG. 20 is like FIG. 19 and shows another embodiment.

Figure 21:
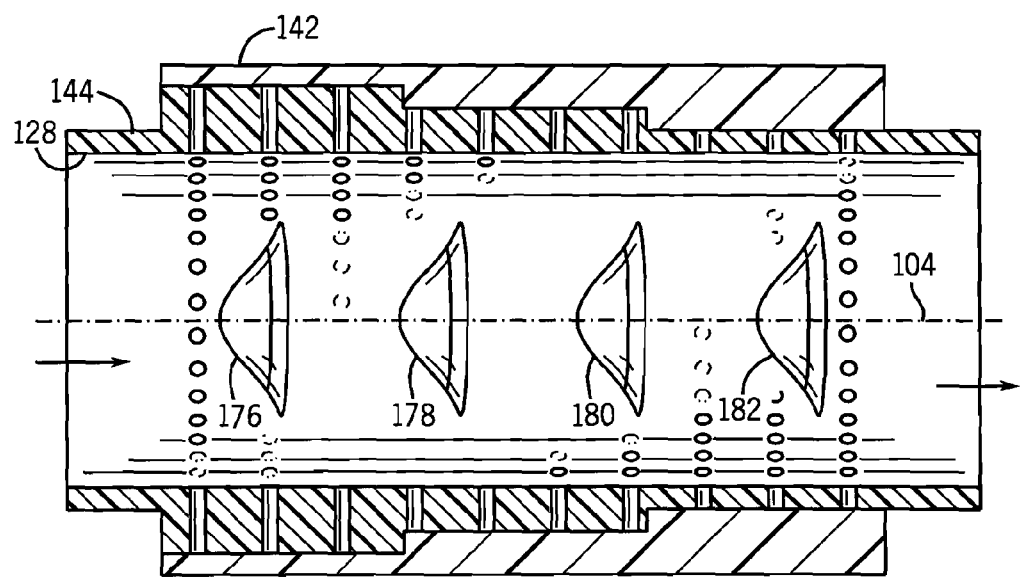

FIG. 21 is like FIG. 17 and shows another embodiment.

Figure 22:
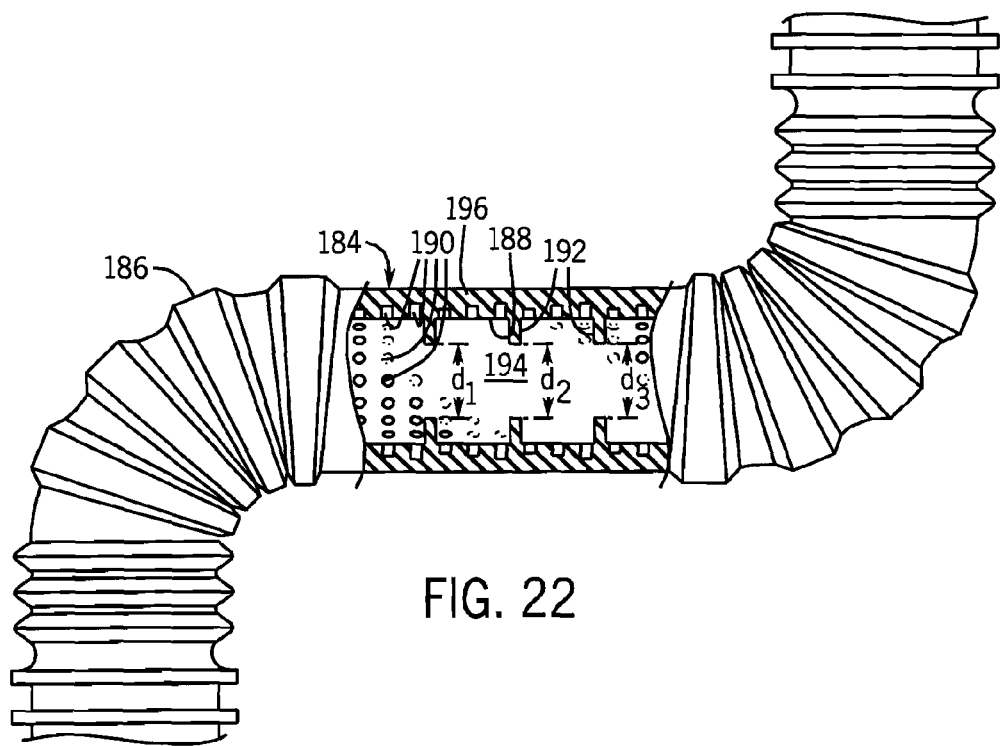

FIG. 22 is a side elevation view partially cut away of another embodiment.

Figure 23:
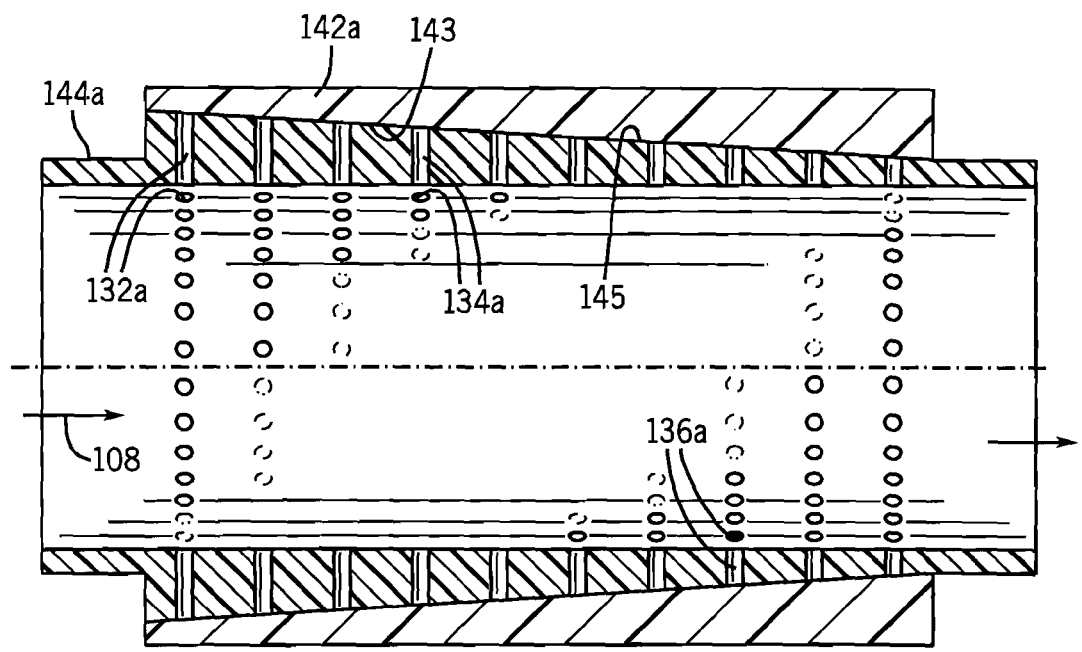

FIG. 23 is like FIG. 16 and shows another embodiment.

DETAILED DESCRIPTION

Parent Application

The following description of FIGS. 1-12 is taken from the noted parent '775 application.

Figure 1:
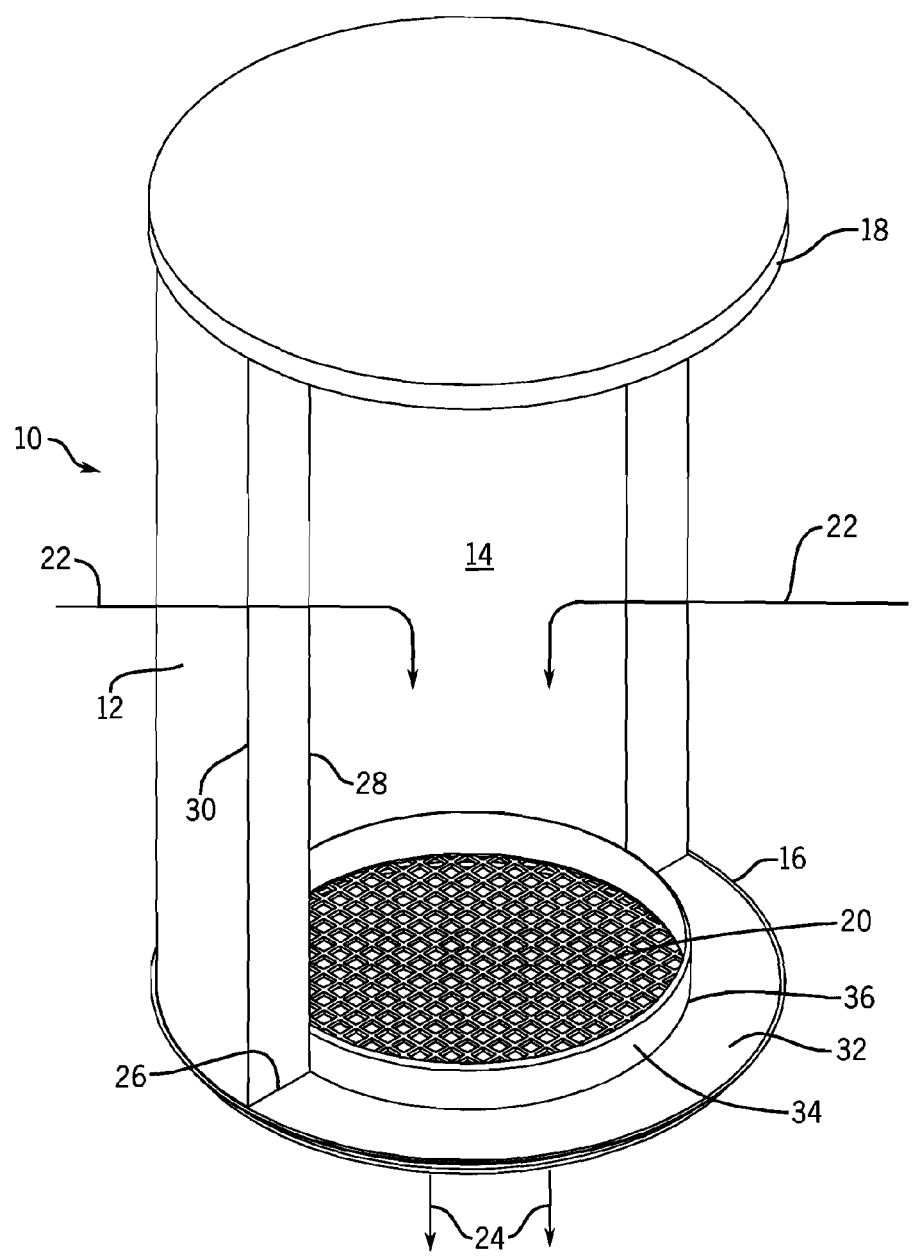
FIGS. 1-12 and the following description thereof are taken from the noted parent '775 application.

FIG. 1 shows an air filtration cartridge 10 including annular filter media 12 having a hollow interior 14 and extending axially between first and second distally opposite end caps 16 and 18. End cap 16 is an outlet end cap having flow straightening structure 20 integrally formed therewith and spanning hollow interior 14. Air flows radially inwardly as shown at arrows 22 through filter media. 12 into hollow interior 14 and then flows from hollow interior 14 axially through flow straightening structure 20 as shown at arrows 24. Flow straightening structure 20 is preferably provided by a grid or matrix having a plurality of openings or apertures therethrough guiding and straightening axial flow at 24 for reducing variability of outlet air flow velocity profile, i.e. providing a more uniform air flow velocity across the entire radial span of the filter cartridge outlet, in the nature of a laminar flow. In a desirable preferred embodiment, the air filtration cartridge is an embedded air filtration cartridge having an injection molded plastic end cap 16 injection molded to media 12 and including plastic flow straightening structure 20 integrally molded therewith. In another embodiment, an injection molded plastic flow straightener is embedded in a radial seal urethane element during curing of the latter. It is desirable that the cross-sectional wall thickness of the grid segments be as thin as possible, to maximize the open area therebetween for air flow therethrough. In a further embodiment, the grid segments 21 of grid 20 have an aerodynamic cross-sectional shape, FIG. 5, e.g. a tear-drop shape or the like.

Figure 2:
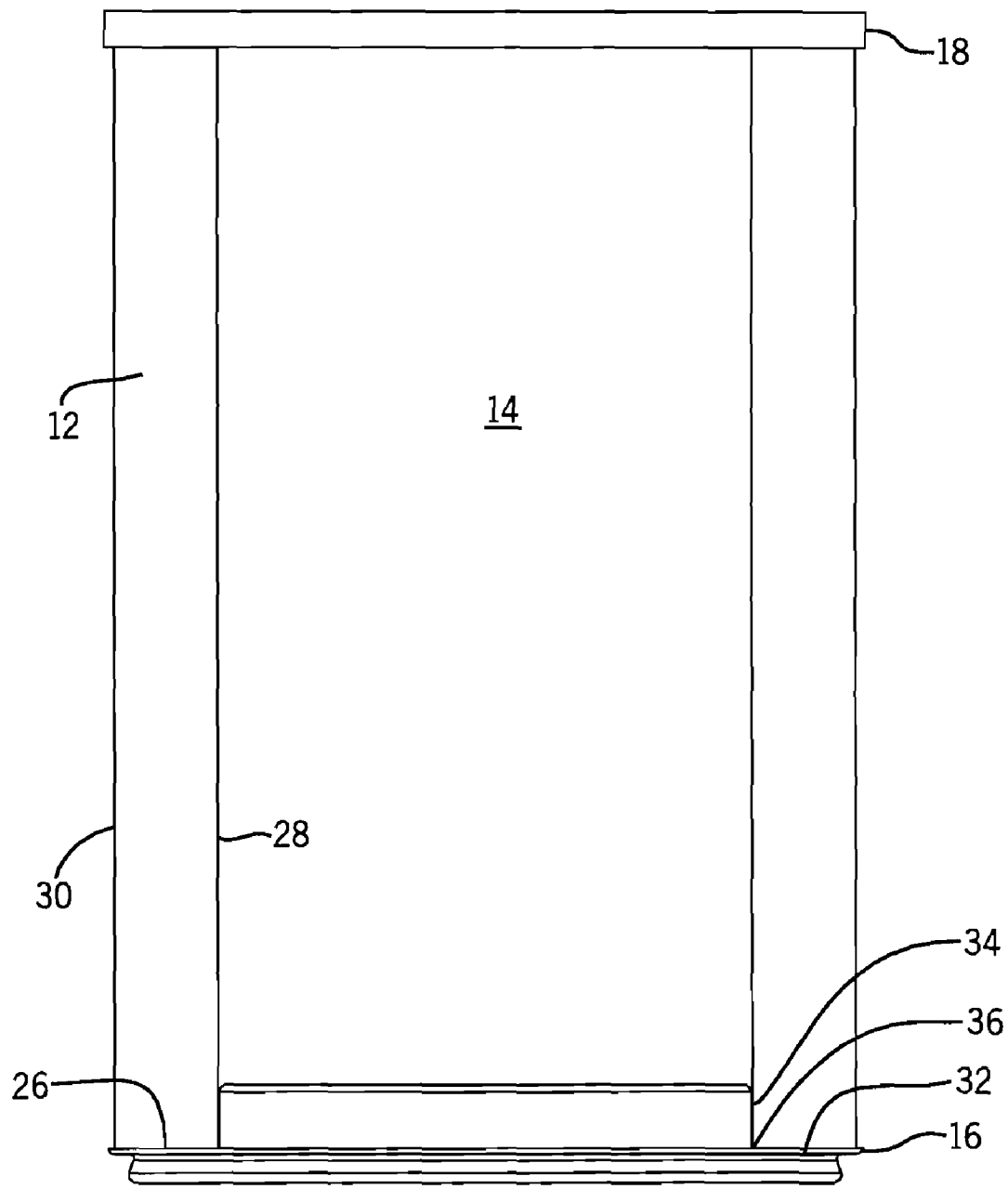

Filter media 12 has an axial end face 26, FIGS. 1, 2, extending radially between inner and outer perimeters 28 and 30. End cap 16 has an integral radial flange 32 extending radially along axial end face 26. End cap 16 has an integral axial flange 34 extending axially along inner perimeter 28. Flow straightening structure 20 extends across hollow interior 14 integrally from at least one of radial flange 32 and axial flange 34. In preferred form, radial and axial flanges 32 and 34 intersect at an interface junction 36, and flow straightening structure 20 extends across hollow interior 14 integrally from junction 36. In the preferred embodiment, flow straightening structure 20 is a plastic grid, FIGS. 3, 4, having an outer perimeter integrally extending from junction 36, FIG. 1. Junction 36 has a T-shape in cross-section, namely an axially extending trunk provided by axial flange 34, and a pair of arms extending oppositely radially therefrom, a first of the arms being provided by radial flange 32, and a second of the arms being provided by the outer perimeter of grid 20, wherein the trunk and the arms meet at junction 36 in the noted T-shape.

Figure 3:
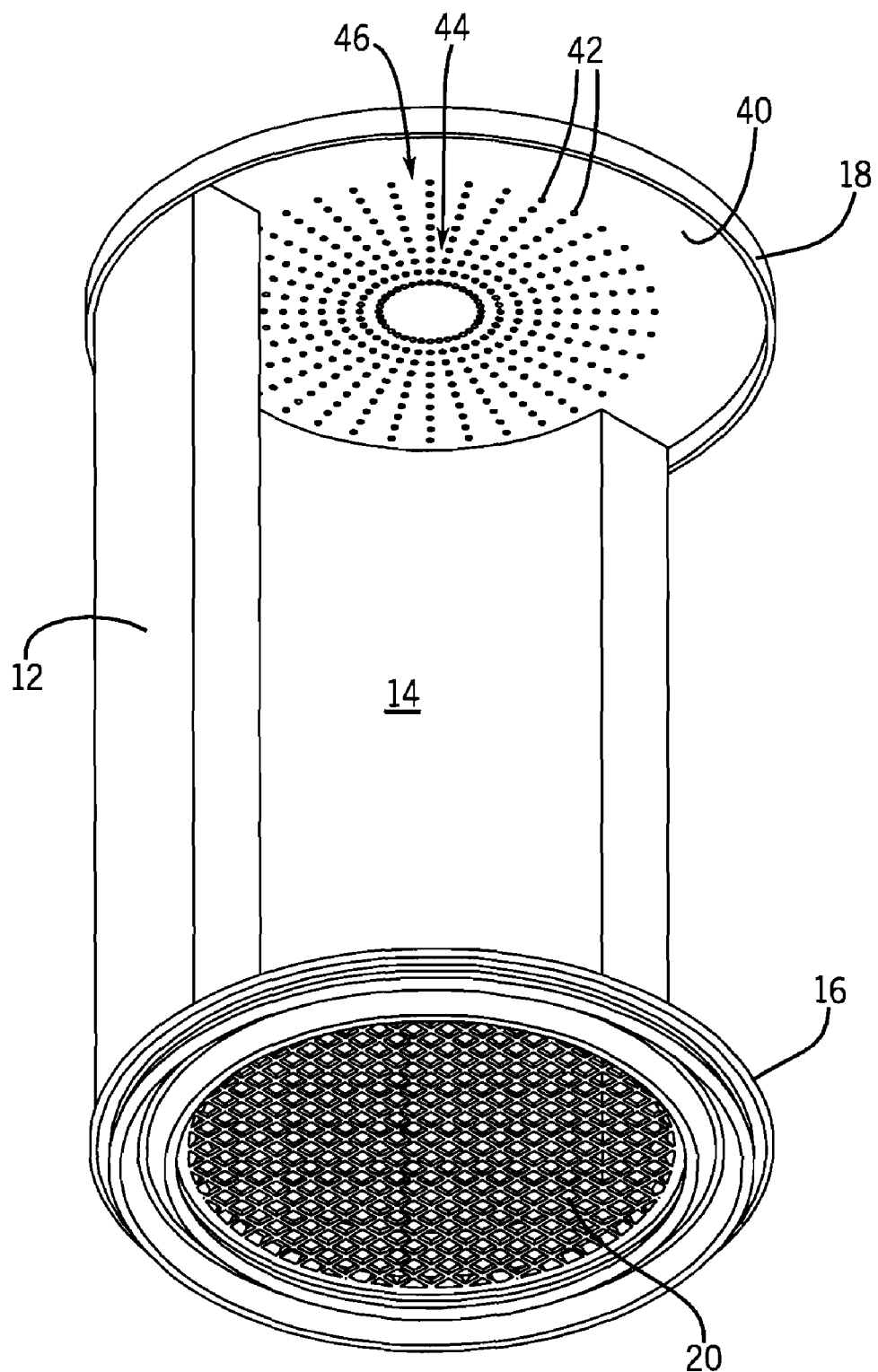
Figure 4:
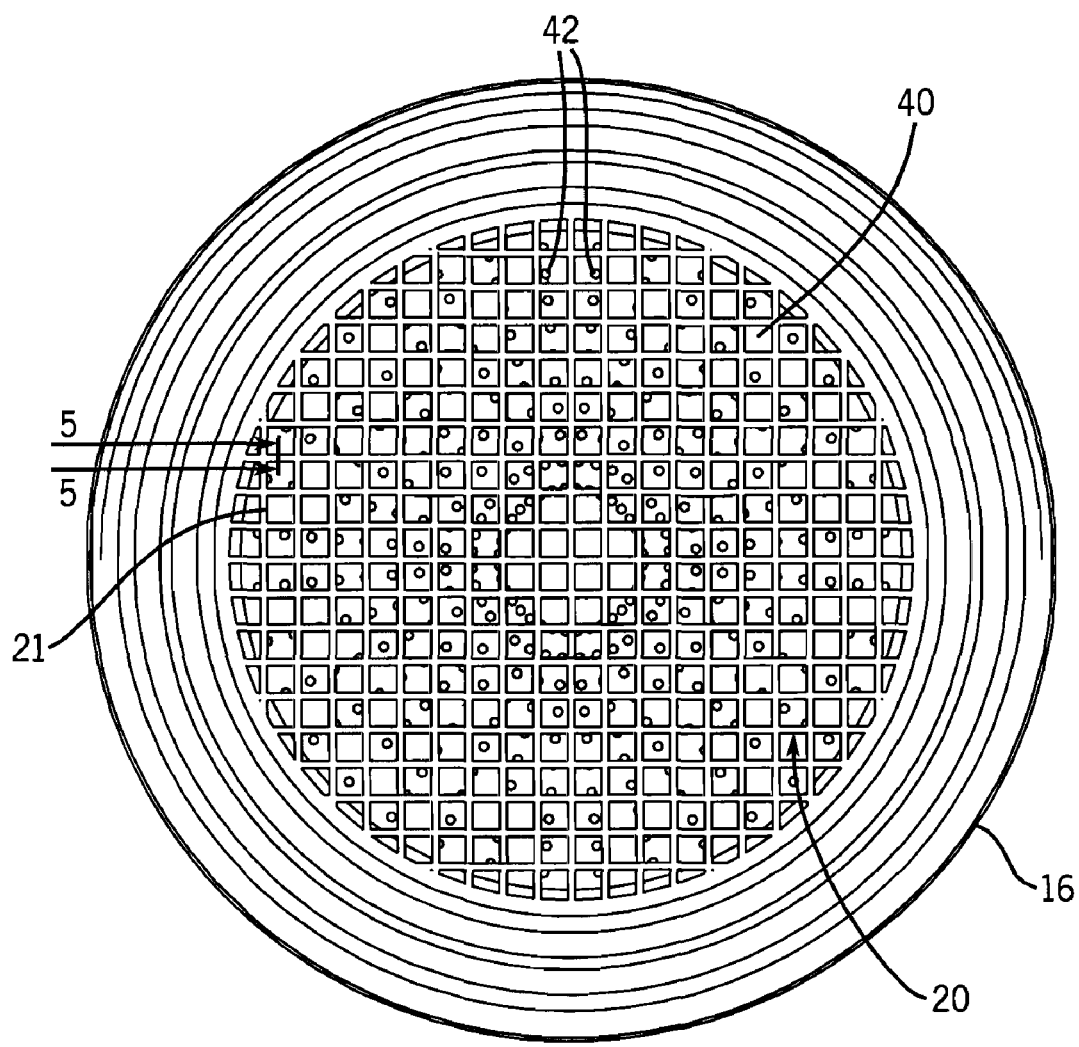
Figure 5:
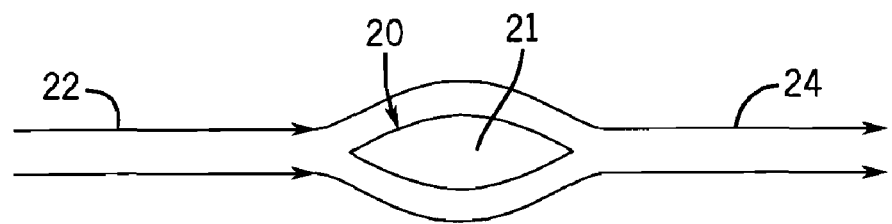

End cap 18, FIGS. 1-3, is a closed end cap having an interior face 40, FIG. 3, facing hollow interior 14 and having quarter wave resonators formed by blind holes 42 therein. In preferred form, the air filtration cartridge is an embedded air filtration cartridge having an injection molded plastic end cap 18 injection molded thereto and including blind holes 42 therein forming the quarter wave resonators. The quarter wave resonators are used for high frequency sound attenuation, e.g. for turbo/supercharged engines which require high frequency sound attenuation.

In one embodiment, interior face 40, FIG. 3, of end cap 18 has a first area 44 of a first density of quarter wave resonator blind holes, and has a second area 46 radially outward of first area 44 and of a second density of quarter wave resonator blind holes. The noted second density is less than the noted first density. In preferred form, the quarter wave resonator blind holes have an axial depth in the range of about 5 to 8 mm, and have a radial width in the range of about 2 to 3 mm. In another embodiment, a first set of one or more resonator holes has a first depth, and one or more additional sets of one or more resonator holes have different depths, for attenuation of different frequencies.

Figure 6:
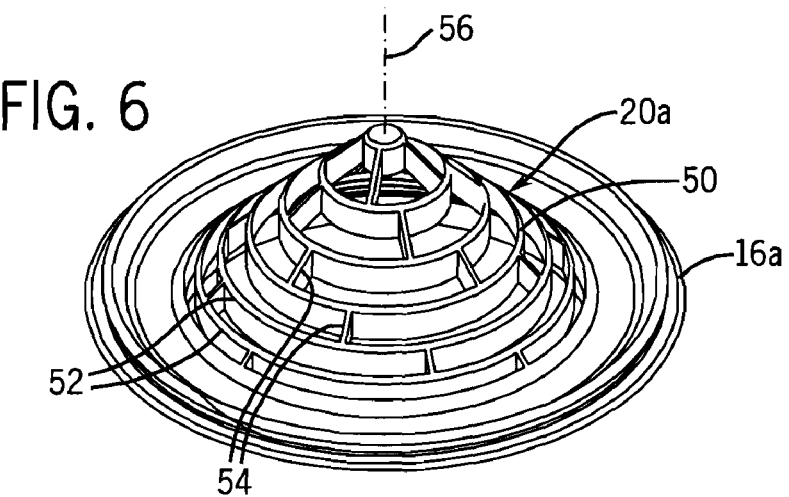
Figure 7:
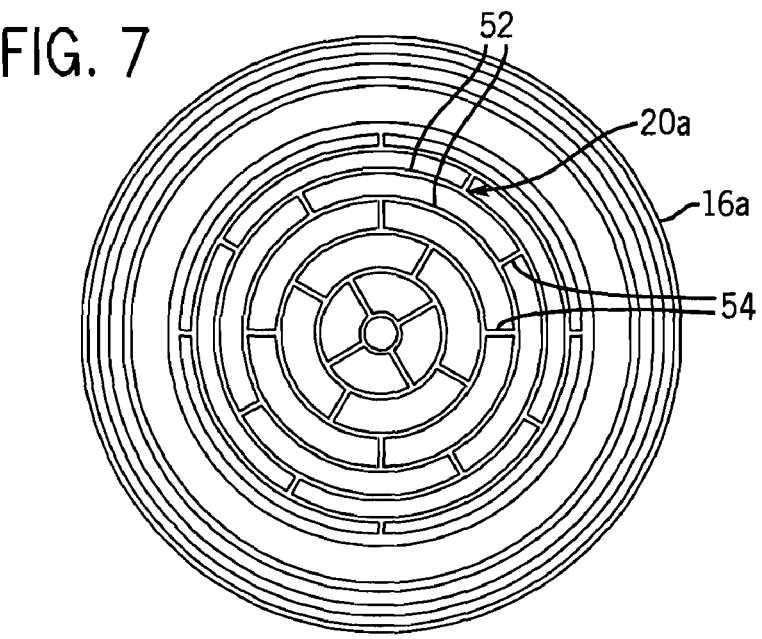
Figure 8:
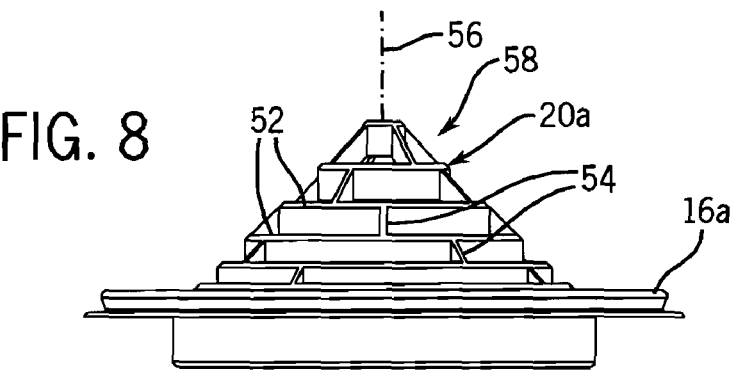
Figure 9:
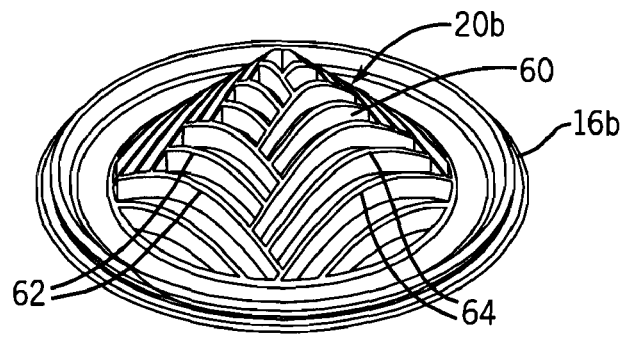
Figure 10:
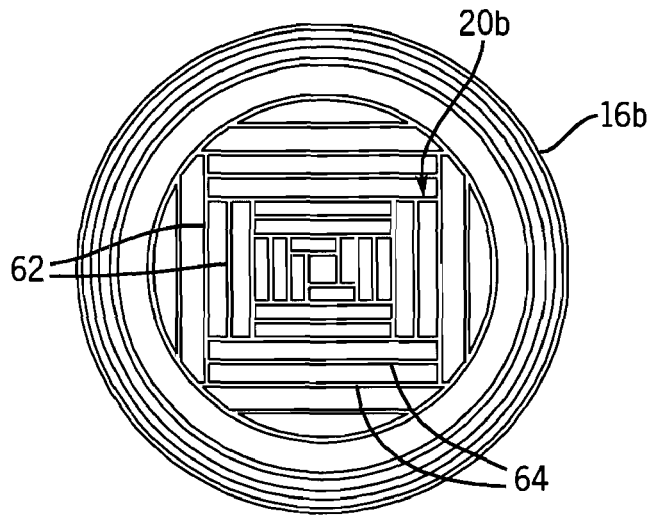
Figure 11:
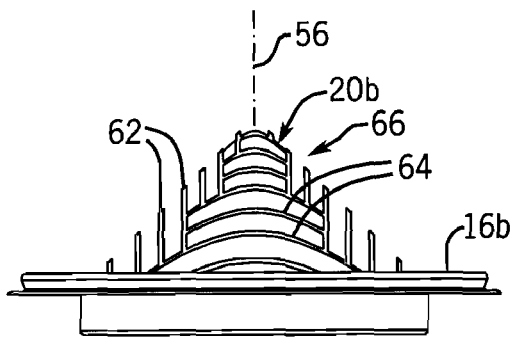
Figure 12:
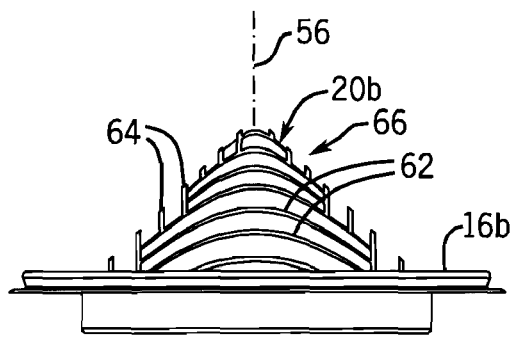

In a further embodiment, FIGS. 6-8, flow straightening structure 20a is provided by a grid having grid segments formed by a plurality of guide vanes 50 guiding the air flow axially through the first end cap 16a of air filtration cartridge 10. The guide vanes include first and second sets of guide vanes 52 and 54 extending transversely to each other. Guide vanes 52 of the first set extend arcuately relative to the axis 56 of axial flow 24. Guide vanes 54 of the second set extend radially relative to axis 56. The guide vanes have a configured axial extension such that first end cap 16a of air filtration cartridge 10 has an outer conical profile 58, FIG. 8, pointing along the axis 56 of axial flow 24.

In a further embodiment, FIGS. 9-12, flow straightening structure 20b is provided by a grid having grid segments provided by a plurality of guide vanes 60 guiding the air flow axially through the first end cap 16b of air filtration cartridge 10. The guide vanes include at least first and second sets of guide vanes 62 and 64 extending transversely to each other. The guide vanes 62 and 64 of each of the first and second sets extend tangentially relative to axial flow 24. The guide vanes have a configured axial extension such that first end cap 16b of air filtration cartridge 10 has an outer conical profile 66, FIGS. 11, 12, pointing along the axis 56 of axial flow 24.

It is recognized that various equivalents, alternatives and modifications are possible. While a circular cylindrical filter media and cartridge is shown, other annular constructions may be used, including oval-shaped, racetrack-shaped, and various closed-loop configurations. The cartridge may include various sealing structures and gaskets for sealingly mating or mounting within a housing, in accordance with known sealing techniques using a separate sealing member or gasket and/or may have a seal integrally formed with one or both of the end caps, for example as shown in commonly owned co-pending U.S. patent application Ser. No. 10/726,974, filed Dec. 3, 2003, U.S. patent application Ser. No. 10/827,509, filed Apr. 19, 2004, U.S. patent application Ser. No. 10/952,631, filed Sep. 29, 2004, U.S. patent application Ser. No. 10/997,257, filed Nov. 24, 2004, all incorporated herein by reference.

Present Application

FIGS. 13-15 show an acoustic silencer 100 provided by a tubular member 102 extending along axis 104 and having a hollow interior 106 defining an axial flow path therethrough as shown at arrow 108. The tubular member has a sidewall 110 with an interior face 112 facing hollow interior 106 and having quarter wave resonators formed by blind holes 114 therein. The blind holes have a depth extending nonparallel relative to axis 104, for example blind holes 114 may extend radially relative to axis 104, or may extend perpendicularly relative to a diameter of the tubular member, or the like. Tubular member 102 is provided by an outer sleeve 116 and an inner liner 118 engaging each other in abutting relation. The quarter wave resonators are formed by holes 114 extending outwardly through inner liner 118 and terminating at outer sleeve 116 to form the blind holes. The resonator attenuation frequency is controlled by depth of the blind holes which in turn is controlled by radial wall thickness of inner liner 118. In one embodiment, the inner liner is provided by a pair of injection molded plastic symmetrical halves 120, 122, FIG. 14, and the outer sleeve is provided by a pair of symmetrical halves 124 and 126 therearound or by a single unitary one-piece outer sleeve molded therearound. In one embodiment, the blind holes have a depth in the range of about 4 to 8 mm, and have an axial width in the range of about 2 to 3 mm.

FIG. 16 shows another embodiment and uses like reference numerals from above where appropriate to facilitate understanding. Interior face 128 of sidewall 130 has a first set of one or more quarter wave resonator blind holes 132 of a first size, and one or more additional sets of one or more quarter wave resonator blind holes, such as 134, 136, and so on, of a different size, for attenuation of different frequencies. For example, first set of blind holes 132 have a first depth 138, and second set of blind holes 134 have a second depth 140 less than first depth 138. Outer sleeve 142 and inner liner 144 engage each other in abutting relation. Inner liner 144 has a first section 146 of a first radial wall thickness, and has a second section 148 of a second radial wall thickness less than the noted first radial wall thickness. First section 146 has the first set of blind holes 132 extending outwardly therethrough and terminating at outer sleeve 142 to form the first set of quarter wave resonator blind holes of the noted first depth 138. Second section 148 has the second set of holes 134 extending outwardly therethrough and terminating at outer sleeve 142 to form the noted second set of quarter wave resonator blind holes of the noted second depth 140. Inner liner 144 has a variable outer circumference of varying outer diameter, including a first portion having a first outer diameter 150 providing the noted first section 146 of inner liner 144 of the noted first radial wall thickness, and has a second portion having a second outer diameter 152 providing the noted second section 148 of inner liner 144 of the noted second radial wall thickness. Second outer diameter 152 is less than first outer diameter 150. Outer sleeve 142 has a variable inner circumference of varying inner diameter including a first portion having a first inner diameter 154 at the noted first section 146 of inner liner 144, and a second portion having a second inner diameter 156 at the noted second section 148 of inner liner 144. Second inner diameter 156 is less than first inner diameter 154.

FIG. 16 shows the noted first, second and third sets of one or more quarter wave resonator blind holes 132, 134, 136, respectively. First set 132 has the noted first depth 138. Second set 134 has the noted second depth 140. Third set 136 has a third depth 158. Third depth 158 is less than second depth 140. Second depth 140 is less than first depth 138. The tubular member is provided by the noted outer sleeve 142 and inner liner 144 engaging each other in abutting relation. Inner liner 144 has the noted first section 146 of a first radial wall thickness, and has the noted second section 148 of the noted second radial wall thickness less than the first radial wall thickness, and has a third section 160 of a third radial wall thickness less than the noted second radial wall thickness. First section 146 has the noted first set of holes 132 extending outwardly therethrough and terminating at outer sleeve 142 to form the noted first set of quarter wave resonator blind holes of first depth 138. Second section 148 has the noted second set of holes 134 extending outwardly therethrough and terminating at outer sleeve 142 to form the noted second set of quarter wave resonator blind holes of the noted second depth 140. Third section 160 has the noted third set of holes 136 extending outwardly therethrough and terminating at outer sleeve 142 to form the noted third set of quarter wave resonator blind holes of the noted third depth 158. Inner liner 144 has a variable outer circumference of varying outer diameter including the noted first portion having first outer diameter 150 providing the noted first section 146 of inner liner 144 of the noted first radial wall thickness, the noted second portion having the noted second outer diameter 152 providing the noted second section 148 of inner liner 144 of the noted second radial wall thickness, and having a third portion having a third outer diameter 162 providing the noted third section 160 of inner liner 144 of the noted third radial wall thickness. Third outer diameter 162 is less than second outer diameter 152. Second outer diameter 152 is less than first outer diameter 150. Outer sleeve 142 has a variable inner circumference of varying inner diameter, including the noted first portion having the noted first inner diameter 154 at first section 146 of inner liner 144, the noted second portion having the noted second inner diameter 156 at the noted second section 148 of inner liner 144, and having a third portion having a third inner diameter 164 at the noted third section 160 of inner liner 144. Third inner diameter 164 is less than second inner diameter 156. Second inner diameter 156 is less than first inner diameter 154.

FIG. 17 shows another embodiment and uses like reference numerals from above where appropriate to facilitate understanding. A baffle 166 is provided in hollow interior 106, and may have an aerodynamic profile or bullet shape, as is known. The baffle may be supported by two or more spokes 168, 170, FIG. 18, as is known. Alternatively, the baffle may have a cross shape as shown at 172, FIG. 19, a star shape as shown at 174, FIG. 20, or various other shapes. In a further embodiment, FIG. 21, a plurality of baffles 176, 178, 180, 182 may be axially spaced along axis 104. In the disclosed embodiment, the one or more baffles are centrally located in hollow interior 106 and spaced from interior face 128 of the sidewall.

In a further embodiment, FIG. 22, the acoustic silencer 184 may be provided along a duct or flexible tubing 186, for example in a motor vehicle air induction system, and have an interior face 188 with blind holes 190 therein providing the noted quarter wave resonators, and with dispersion baffles 192 extending radially inwardly into hollow interior 194 from interior face 188 of sidewall 196. The axis 104 of the axial flow path in FIGS. 13-21 is rectilinear, whereas such axis in FIG. 22 is curved. The inner diameters of the dispersion baffles 192, e.g. as shown at $d_1$, $d_2$, $d_3$ may be the same or may be varied.

In a further embodiment, the step-change configuration of FIG. 16 is replaced by a tapered configuration, FIG. 23. The step-changing inner diameter of outer sleeve 142 of FIG. 16 is replaced by an outer sleeve 142a having a smooth tapered variable inner circumference 143. Inner liner 144 of FIG. 16 having a step-change outer circumference is replaced in FIG. 23 with inner liner 144a having a tapered smooth variable outer circumference 145. This provides multiple sets of quarter wave resonator blind holes such as 132a, 134a, 136a, etc. of continuously varying depth.

It is recognized that various equivalents, alternatives and modifications are possible within the scope of the appended claims. For example, tubular includes not only cylindrical but also oval shapes, racetrack shapes, and other closed loop shapes.

What is claimed is:

1. An acoustic silencer comprising a tubular member extending along an axis and having a hollow interior defining an axial flow path therethrough, said tubular member having a sidewall with an interior face facing said hollow interior and having quarter wave resonators formed by blind holes therein, wherein said tubular member comprises an outer sleeve and an inner liner engaging each other in abutting relation, said quarter wave resonators being formed by holes extending outwardly through said inner liner and terminating at said outer sleeve to form said blind holes, and wherein said inner liner comprises a pair of symmetrical halves.

2. An acoustic silencer comprising a tubular member extending along an axis and having a hollow interior defining an axial flow path therethrough, said tubular member having a sidewall with an interior face facing said hollow interior and having quarter wave resonators formed by blind holes therein, wherein said interior face of said sidewall has a first set of one or more quarter wave resonator blind holes of a first size, and one or more additional sets of one or more quarter wave resonator blind holes of a different size, for attenuation of different frequencies, wherein said first set of blind holes have a first depth, and comprising a second said additional set of one or more quarter wave resonator blind holes having a second depth less then said first depth, and wherein said tubular member comprises an outer sleeve and an inner liner engaging each other in abutting relation, said inner liner having a first section of a first radial wall thickness, said inner liner having a second section of a second radial wall thickness less than said first radial wall thickness, said first section having a first set of one or more holes extending outwardly therethrough and terminating at said outer sleeve to form said first set of one or more quarter wave resonator blind holes of said first depth, said second section having a second set of one or more holes extending outwardly therethrough and terminating at said outer sleeve to form said second set of one or more quarter wave resonator blind holes of said second depth.

3. The acoustic silencer according to claim 2 wherein:
    said inner liner has a variable outer circumference of varying outer diameter, including a first portion having a first outer diameter providing said first section of said inner liner of said first radial wall thickness, and a second portion having a second outer diameter providing said second section of said inner liner of said second radial wall thickness, said second outer diameter being less than said first outer diameter;
    said outer sleeve has a variable inner circumference of varying inner diameter, including a first portion having a first inner diameter at said first section of said inner liner, and a second portion having a second inner diameter at said second section of said inner liner, said second inner diameter being less than said first inner diameter.

4. The acoustic silencer according to claim 3 wherein said outer circumference of said inner liner and said inner circumference of said outer sleeve vary in step-change manner.

5. The acoustic silencer according to claim 3 wherein said outer circumference of said inner liner and said inner circumference of said outer sleeve vary in tapered relation.

6. The acoustic silencer according to claim 5 wherein each of said outer circumference of said inner liner and said inner circumference of said outer sleeve vary along a taper providing variable depth quarter wave resonator blind holes.

7. An acoustic silencer comprising a tubular member extending along an axis and having a hollow interior defining an axial flow path therethrough, said tubular member having a sidewall with an interior face facing said hollow interior and having quarter wave resonators formed by blind holes therein, wherein said interior face has first, second and third sets of one or more quarter wave resonator blind holes, said first set having a first depth, said second set having a second depth, said third set having a third depth, said third depth being less than said second depth, said second depth being less than said first depth, said tubular member comprising an outer sleeve and an inner liner engaging each other in abutting relation, said inner liner having a first section of a first radial wall thickness, a second section of a second radial wall thickness less than said first radial wall thickness, and a third section of a third radial wall thickness less than said second radial wall thickness, said first section having a first set of one or more holes extending outwardly therethrough and terminating at said outer sleeve to form said first set of one or more quarter wave resonator blind holes of said first depth, said second section having a second set of one or more holes extending outwardly therethrough and terminating at said outer sleeve to form said second set of one or more quarter wave resonator blind holes of said second depth, said third section having a third set of one or more holes extending outwardly therethrough and terminating at said outer sleeve to form said third set of one or more quarter wave resonator blind holes of said third depth, said inner liner having a variable outer circumference of varying outer diameter, including a first portion having a first outer diameter providing said first section of said inner liner of said first radial wall thickness, a second portion having a second outer diameter providing said second section of said inner liner of said second radial wall thickness, and a third portion having a third outer diameter providing said third section of said inner liner of said third radial wall thickness, said third outer diameter being less than said second outer diameter, said second outer greater diameter being less than said first outer diameter, said outer sleeve having a variable inner circumference of varying inner diameter, including a first portion having a first inner diameter at said first section of said inner liner, a second portion having a second inner diameter at said second section of said inner liner, and a third portion having a third inner diameter at said third section of said inner liner, said third inner diameter being less than said second inner diameter, said second inner diameter being less than first inner diameter.

* * * * *